(No Model.) 3 Sheets—Sheet 3.
P. H. ADAMS, Jr. & O. T. X. ADAMS.
PLANT FOR USE IN SMELTING ORES.
No. 399,125. Patented Mar. 5, 1889.
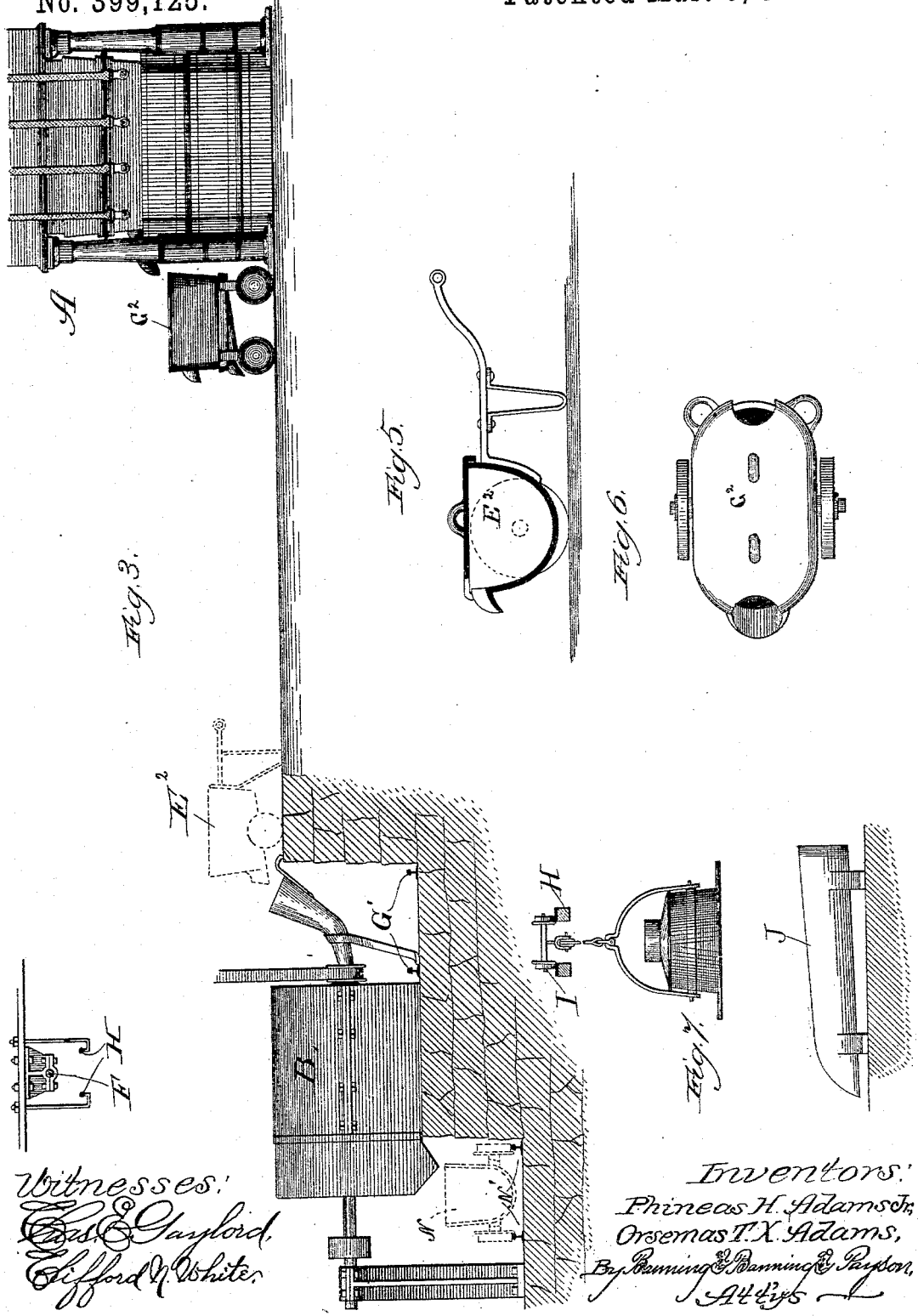

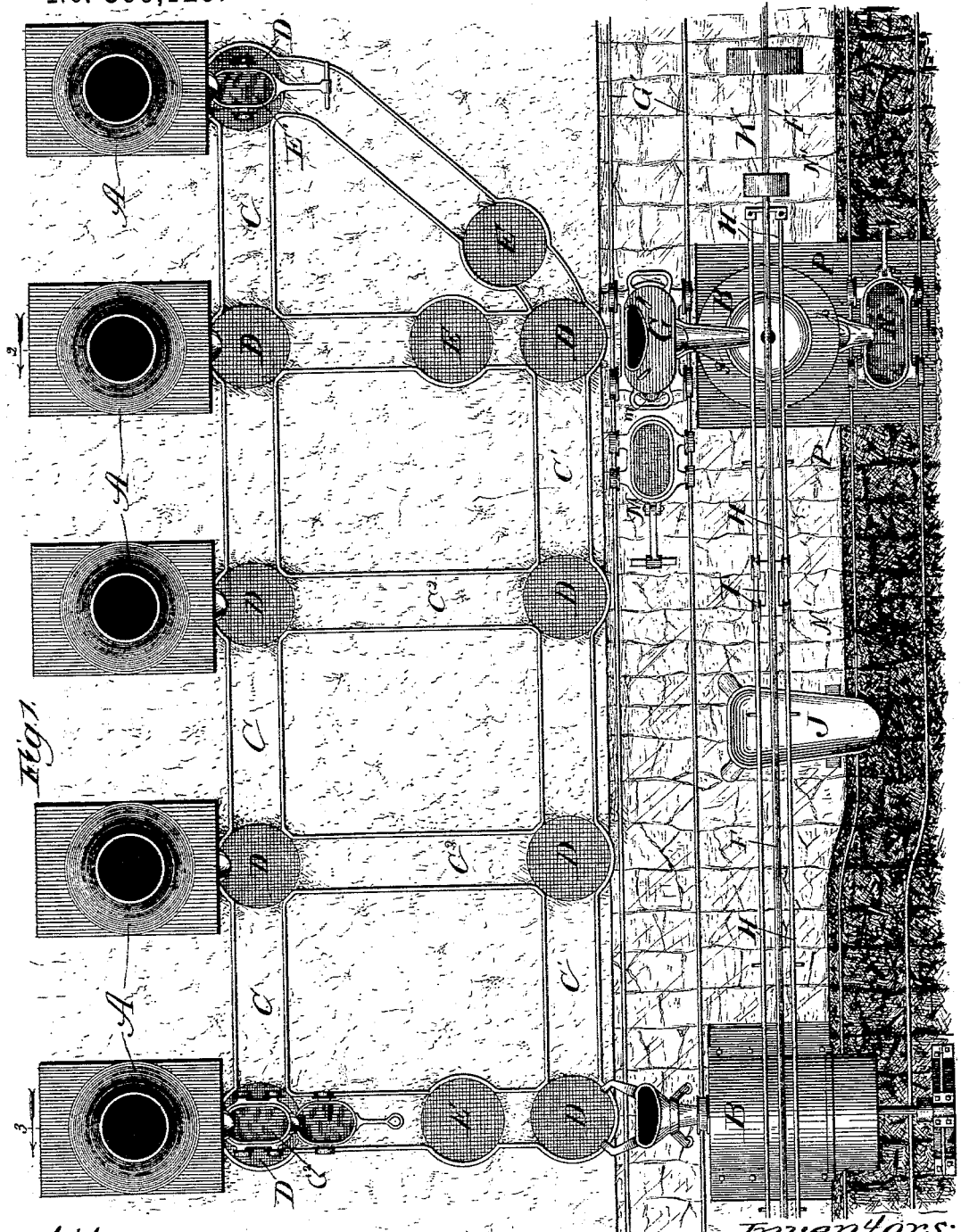

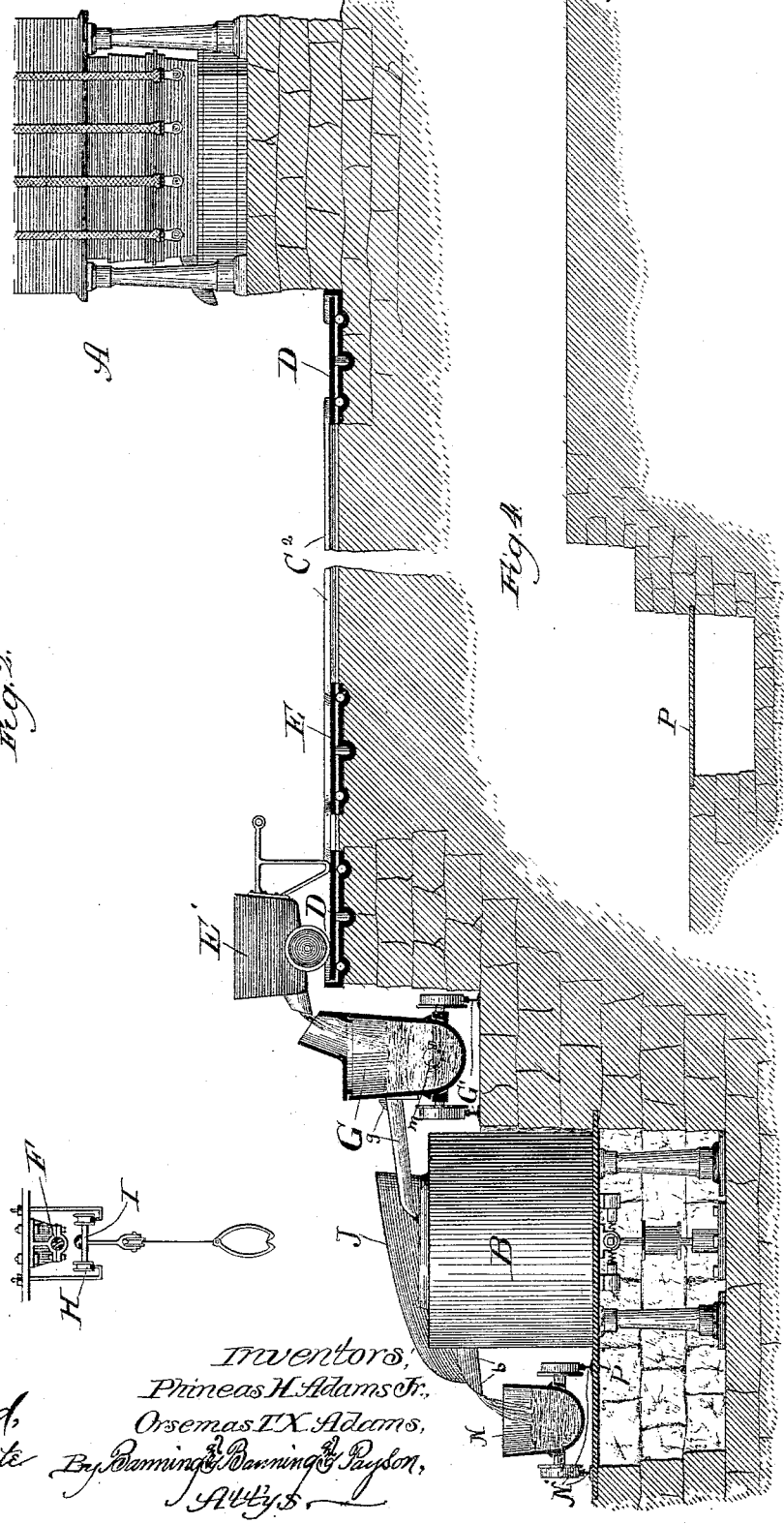

United States Patent Office.

PHINEAS H. ADAMS, JR., AND ORSEMAS T. X. ADAMS, OF CHICAGO, ILLINOIS, ASSIGNORS TO MELINDA PECK, OF SAME PLACE.

PLANT FOR USE IN SMELTING ORES.

SPECIFICATION forming part of Letters Patent No. 399,125, dated March 5, 1889.

Application filed January 3, 1889. Serial No. 295,371. (No model.)

*To all whom it may concern:*

Be it known that we, PHINEAS H. ADAMS, Jr., and ORSEMAS T. X. ADAMS, citizens of the United States, residing at Chicago, Illinois, have invented a certain new and useful Plant for use in Smelting Ores, of which the following is a specification.

The object of our invention is to arrange a plant for use in smelting ores and centrifugally treating the resulting material and mechanically decomposing chemical compounds, metallic salts, or salts of metals, and desulphurizing ores or their resulting materials as they flow from the smelting-furnaces, when the substances treated are in a molten condition, by the action of centrifugal force, and handling and disposing of the material treated in the most convenient and economical manner; and our invention consists in the arrangement and combination and relations of the various features and parts hereinafter described and claimed.

Right here, however, we wish to say that in the consideration of the plant hereinafter described and claimed in the Patent Office or elsewhere we desire it to be distinctly understood and borne in mind that our inventions are intended not only to be applied to any use to which they are adapted, but to have more particular reference to the practical application or reduction to use in the most advantageous manner of the process described and claimed by Orrin B. Peck in the Letters Patent issued to him November 6, 1888, No. 392,456, for a process of desulphurizing ores and decomposing metallic salts, in the drawings and description of which he made use of improvements in centrifugal apparatus of our invention to illustrate one means of effectuating or embodying his process, and which, in his specification, he acknowledges, though with slight inaccuracy, when he says that the apparatus which he describes and shows is the invention of Phineas H. Adams, Jr., of Chicago.

To enable a more comprehensive understanding of our invention, we will here say that in carrying it out, and in the construction, arrangement, and operation of our plant for the purpose above described, we secure certain relations and conditions that are very desirable, and some of them essential, to be secured or produced and maintained to effectuate, facilitate, and promote the most convenient and effective operation and co-operation of the various parts and features entering into the plant and to facilitate and secure the most effective, complete, rapid, and economical treatment, separation, or decomposition and disposition of the materials smelted or melted and treated, and also to secure the greatest possible capacity of a plant in its operation.

In conducting the operations of smelting-furnaces it is necessary to have them located in such a manner as will permit of free access to and around their base to enable the workmen to tap the furnace at the proper time, handle the molten material or product, and attend to much work that is always incumbent upon them while carrying on the operations of the furnace or plant, and to permit of this it is necessary to have some considerable space on the surface of the dump around the smelting-furnaces in and upon which to handle mattes and speiss and for other purposes. This surface or space should be of some extent and as little encumbered with machinery as possible; and, on the other hand, to secure the best and most complete, as well as economical, results in the centrifugal treatment of the molten material from the smelting-furnaces, it is desirable to keep the material as nearly at furnace temperature as possible, so as to keep or have it in a thin fluid state of fusion until it has been treated and thrown off or discharged from the centrifugal apparatus. We aim to accomplish both of these objects or conditions as hereinafter described. To maintain this state of thin fluidity of the molten material, which is necessary while passing through the centrifugal apparatus and undergoing incipient and progressive stages of treatment, separation, or decomposition, it is very desirable, if not quite necessary, to have a continuous or nearly continuous flow of the material to be treated into the revolving receiving-vessel of the apparatus, which will prevent its crusting over or hardening by or through loss or radiation of its heat, thereby preventing or retarding effective decomposition or separation of the materials while passing through the revolving receiving-vessel and undergoing treatment. To secure the most complete and effective treatment and to insure the best operation of the apparatus, the molten material should also be introduced into the revolving receiving-vessel with as much uniformity of flow as possible compatible with the treatment capacity of the apparatus. It is also preferable to handle the molten material to be treated in such manner before it is introduced into the revolving receiving-vessel of the apparatus, when the properties and condition of such material render it possible, as will enable the heaviest parts or properties of the material or those most influenced by gravitation to be precipitated or collected by gravitation and prevented from flowing into the receiving-vessel. The purpose and object of this are to reduce the service of the receiving-vessel—that is, to reduce the amount of material collected and retained in it—thereby filling it up less frequently and necessitating its removal from the apparatus for emptying the material so collected less frequently.

As the centrifugal apparatus is quite tall or high, comparatively speaking, the ones constructed vertically being sometimes ten or twelve feet, or even higher, although some are not so high, and as the molten material to be treated is introduced into the revolving receiving-vessel of the apparatus near or through its top, and as the conveyers or vessels conveying or carrying the molten material from the smelting-furnaces to the apparatus run or travel on the surface of the dump upon which the smelting-furnaces stand, and as these conveyers are usually about from twenty to thirty inches in height, it will be understood that unless the molten material is elevated to a sufficient height to permit its introduction into the revolving receiving-vessel of the apparatus the apparatus must be lowered, so that its top or the point where the molten material is introduced is sufficiently low.

Instead of elevating the material to be treated, we prefer to lower the apparatuses, so that their mouths will be near the surface upon which the conveyers pass to and from the smelting-furnaces; and where an intermediate receiving or precipitating vessel is employed the top of the apparatus should be still lower to accommodate the use of this vessel. We deem the most desirable location or height for the apparatus that which will bring its top, or the point where the molten material is introduced into it, to about a level of or somewhat lower than the surface of the ground or dump upon which the smelting-furnaces stand and upon which the conveyers or vessels that carry the molten material from the smelting-furnaces to the apparatus run; but where a storage or precipitating vessel is used next to the apparatus, then such point, for convenience, should be somewhat lower.

To remove and handle the cover and parts of the apparatus preparatory to removing the revoluble receiving-vessel to empty it when it has become filled, or to remove the vessel at any time with the material collected and to replace it again, it is also necessary to provide means for this purpose; and to most conveniently receive the material treated from the apparatus and handle it for final disposition it is desirable to provide and arrange a track or surface and conveyer or car that will pass or run in proximity to the apparatus for this purpose; and as the revoluble receiving-vessels of the apparatus are to be revolved very rapidly it is also necessary to provide and arrange suitable means through which this may be accomplished.

To best secure the various conditions, features, relations, objects, and results above mentioned, we have devised and arranged our invention substantially as shown in the drawings and herein set forth, although, as hereinafter stated, we do not confine ourselves to the exact arrangement of parts or the use of all of them in one plant.

In the drawings, Figure 1 is a plan view of our plant, with our furnaces and centrifugal apparatuses in place. Fig. 2 is a vertical section on the line 2 of Fig. 1, showing some of the parts in elevation. Fig. 3 is a vertical section on the line 3 of Fig. 1, illustrating some modifications. Figs. 4, 5, 6, and 7 are views of details, hereinafter described.

In arranging our plant for use in melting or smelting ores, and centrifugally treating the resulting materials, and mechanically decomposing chemical compounds, metallic salts, or salts of metals, and desulphurizing ores or their resulting material as they flow from the smelting-furnaces, and while the substances treated are in a molten condition, by the action of centrifugal force, and handling and disposing of the materials treated, we prefer to arrange the smelting furnace or furnaces and the centrifugal apparatus or apparatuses in such relation to each other that the material to be treated may be conveniently and speedily conveyed from the smelting-furnaces to the apparatuses in which it is treated. To this end we prefer to arrange a number of smelting-furnaces preferably in close proximity to each other, and, where more than one are used, in a line or row, and to arrange a number of centrifugal apparatuses in proximity to each other and to the smelting-furnaces, and, where more than one are used, preferably in a row on the same side of the smelting-furnaces, and at the same time preferably on a lower plane than the smelting-furnaces.

We do not propose in this patent to claim any special construction of smelting-furnaces, nor any special construction of the centrifugal apparatuses. We contemplate the use of different kinds of smelting-furnaces and of different kinds of centrifugal apparatuses, whether arranged vertically or horizontally, though we prefer to make them of the construction described and claimed in some one or other of our various applications for patents relating to their construction and operation. We need not, therefore, enter into the details of constructions of either the furnaces or the centrifugal apparatuses, but shall proceed to describe the adaptation of them to each other to secure the results desired in the most convenient, effective, and economical manner.

After arranging the smelting-furnaces A, intended to enter into the plant in their respective positions, and, as before said, where more than one are used, preferably in a row and on the same plane, we arrange the centrifugal apparatuses B close to them, and, where more than one are used, preferably in a row and preferably on a lower plane—as in a trench, excavation, shelf, or natural depression of the ground—so as to bring them into such relative height to the smelting-furnaces or the cars or conveyers conveying the molten material to them as that the material in a molten state may readily, conveniently, and speedily, and preferably without elevating it, be conveyed from the furnaces into the apparatuses. If the centrifugal apparatuses be arranged in a trench or excavation, it preferably should be of sufficient size to permit access to the running-gear or such parts of the apparatuses as are located therein, and, if desired, or when the location of the discharge from the apparatus requires it, this space should be sufficient to permit of and be provided with a passage for the introduction of a car or other means for receiving and conveying away the material discharged by centrifugal force from the receiving-vessels of the apparatus. The receiving-vessels of the centrifugal apparatuses should be rotated at a high rate of speed and appropriate means employed for that purpose, which we have shown in the drawings as a line-shaft, F, carrying pulleys K, that are adapted to have belts run from them to the band or belt wheels of the actuating-shafts of the apparatuses; but they need not be described in detail, and any other appropriate means may be employed for the purpose.

Leading from each of the smelting-furnaces which enter into the plant, where more than one are used, we preferably arrange a system of tracks consisting, preferably, of two main tracks, C and C', arranged, respectively, in front of the smelting-furnaces, and the centrifugal apparatuses, where more than one are used, connected by branch tracks C² to enable a car or conveyer, E', containing molten material, to pass conveniently and rapidly from preferably any of the smelting-furnaces to any of the centrifugal apparatuses desired. We have shown these main tracks and branch tracks as arranged at right angles to each other, except as to one track, where we have shown it running diagonally from one of the smelting-furnaces to one of the centrifugal apparatuses. This diagonal arrangement of tracks may be adopted with advantage in some cases, while the general arrangement shown in Fig. 1 we think will be found best adapted for general application, though we do not limit ourselves to an arrangement of any of the tracks at right angles to each other.

Arranged at the intersections of the various tracks we preferably provide what may be termed "turn-tables" D, to enable the conveyer containing the molten material to be conveniently and readily turned, as may be desired, in running it with its molten material to the centrifugal apparatuses and back to the furnaces empty, and we preferably also provide turn-tables E in some of the tracks and not at the intersections of other tracks, as it will often be found convenient to turn the conveyer before reaching the centrifugal apparatus, where the matter of room or space is to be considered. The car or conveyer is intended to be of a proper size to contain about the quantity of molten material that will be tapped or discharged at one time from a smelting-furnace, and is preferably provided with wheels to enable it to be readily run along the tracks.

In Figs. 1 and 2 we have shown a storage and precipitating vessel, G, arranged between the smelting-furnaces and the centrifugal apparatuses, adjacent to the latter and preferably on a plane intermediate in height between the two, preferably located and arranged in such relation to the apparatus as will enable the molten material to flow from this vessel into the revolving receiving-vessel of the apparatus by its own gravitation through a spout, g, or other means. This arrangement will also permit of the molten material being easily and quickly emptied into the storage and precipitating vessel and permit it to flow therefrom through the pipe or spout g, provided for the purpose, into the receiving-vessel of the centrifugal apparatus in a comparatively steady and uniform stream. By the use of a storage-vessel, into which the molten material may be emptied or dumped in any quantity as it comes from the different smelting-furnaces, the material may be discharged or flow from this vessel into the centrifugal apparatus in a constant and uniform stream, as above stated, adapted in size to the most perfect and effective operation of the centrifugal apparatus which can be secured, while the car or conveyer thus being quickly dumped or emptied without heed to or materially affecting the flow of its molten material to the apparatus can be immediately used again, and before it has had time to cool, so that the quantity of material solidified, or partly solidified, in transit from the smelting-furnaces is reduced to a minimum. The great utility and importance of this vessel for receiving, storing, and feeding the molten material, in connection with a smelting-furnace and centrifugal apparatus, can be readily understood and appreciated. The spout or pipe $g$ from this storage-vessel may be located at any position near its bottom that circumstances may render convenient, and the hole through which the molten material flows may be properly proportioned in size for the flow of the desired stream of material.

To permit the storage-vessel to be moved along from one centrifugal apparatus to another, or to empty it, as will occasionally be found desirable, we preferably provide a track, G', running along the plane on which it is arranged. As above intimated, the storage-vessel is also preferably employed as a precipitating-vessel to enable the heaviest portion of material, or those most influenced by gravitation, to precipitate or settle to the bottom and be caught without passing into the centrifugal apparatus. When thus used the hole or spout $g$, through which the molten material passes to the centrifugal apparatus, should be sufficiently above the bottom to leave space or room in which the material may precipitate or settle. When the material thus caught has accumulated in sufficient quantity, this vessel may be run down opposite a chute, J, or to any convenient receptacle, and its contents dumped or emptied and cared for, as hereinafter described; but we prefer to provide this storage and precipitating vessel with another hole or spout, $m$, lower than the one $g$, through which the material precipitated may be tapped or drawn from time to time when necessary. We also prefer to provide a car or receptacle, M, running on the tracks G', to receive this precipitated material as it is tapped from the vessel G and carry it away. The hole $m$ is stopped with clay while not being used, which is removed with a bar when desired.

It will be seen that by the use of a precipitating-vessel in connection with a smelting-furnace and a centrifugal apparatus, by passing the molten material through the precipitating-vessel before it passes into the revolving receiving-vessel of the apparatus, and collecting or precipitating all of the heaviest material desired to be recovered or collected and that is sufficiently influenced by gravitation to precipitate, the receiving-vessel of the apparatus will not become filled so frequently with this heavy material, and hence will not have to be emptied so frequently, necessitating stoppage of the apparatus for the removal and emptying of the collected material, which of course will increase the treatment capacity of the apparatus, as it may be run more continuously or with fewer interruptions.

In Fig. 3 we have shown a precipitating-vessel, $G^2$, arranged immediately in front of a smelting-furnace instead of adjacent to the centrifugal apparatus. In this figure, which also represents a horizontal centrifugal apparatus, we have shown the material as emptied from a car or conveyer, $E^2$, into a spout, through which it is directed into the receiving-vessel of the apparatus. Here the storage-vessel is dispensed with. In this case we have also dispensed with the system of tracks from the smelting-furnaces illustrated in Fig. 1, and simply provide a smooth surface over which the conveyers may be run, and provide conveyers that are adapted to pass or run over such a surface instead of on tracks.

In order to lift out the receiving-vessels of the centrifugal apparatuses, when it is desirable to empty that portion of the material which has not been thrown off by the action of centrifugal force, and to empty their contents into a receptacle, and to move or handle the cover or top and other parts of the apparatus, we prefer to provide an overhanging tramway, H, above the centrifugal apparatuses. A derrick or tackle car, I, is arranged to run back and forth on the tramway on wheels adapted for the purpose. This car is provided with a suitable hoist, derrick, or tackle to enable the cover of the apparatus to be removed and the receiving-vessels to be caught with hooks or otherwise and lifted out of the centrifugal apparatuses, as specially shown in detail in Figs. 2 and 7. It will be found most convenient to provide more than one of the "derrick-cars," as we have termed them, to run on this tramway; but we do not limit ourselves to this special form of tackle, hoist, or derrick car or arrangement of the same.

When it is desired to empty the contents of the receiving-vessel of one of the centrifugal apparatuses, the derrick-car is run along the tramway to a position over the centrifugal apparatus. The top of the apparatus is removed, and the receiving-vessel lifted by a hoist to a proper height, when the car carrying the receiving-vessel is moved along the track to the place where the contents of the receiving-vessels are to be emptied. We prefer to provide a common chute, J, into which the contents of the different receiving-vessels may be emptied. This chute is preferably placed between the centrifugal apparatuses, when more than one apparatus are used, so as to be in the handiest position with reference to their location. It is preferably extended over a track, N', as shown in Fig. 1, so that a car can be run under its end and the material deposited in it flowed or emptied into the car, whence it may be conveyed to any desired place. The chute J may also serve for receiving the material from the car M and vessel G. This track N', as shown in the drawings, permits cars to be run into position to receive and carry away not only the material deposited in the chute J, but also the material thrown off from the receiving-vessels by the action of centrifugal force. A car, N, is shown in Figs. 1 and 2 receiving the material so thrown off. The track of course is extended to any convenient distance for the final disposition of the matter thrown off from the receiving-vessels. When the centrifugal apparatus is almost entirely in an excavation, or so much so as to require it, this car or conveyer N or other suitable one, and, when desired, the track N', may be run or pass through a suitable passage to such excavation to receive and convey the material discharged from the apparatus. It is preferable in all instances when the apparatus sets in an excavation, either wholly or partially, to cover such parts of the excavation as is practicable with a covering or roofing, which we have indicated by P in Figs. 1, 2, and 4, to afford as nearly a level and unobstructed surface for convenience of operation over or about the top of the apparatus as possible. In most cases it is very desirable, as before suggested, to place the centrifugal apparatus wholly or partially in an excavation to render it sufficiently low for the convenient and speedy introduction of the molten material into the revolving receiving-vessel of the apparatus, and also to afford as little obstruction to the surface of the dump around the furnace and entire plant as possible, and as far as practicable these excavations should be covered, so as to afford a smooth even surface for the workmen and the operation of the plant.

While we do not wish to confine ourselves to the exact details of construction and arrangement of parts shown in the drawings, as they may be varied to some extent to suit the operator and the conditions and locality of their operations, we prefer to provide the various vessels and conveyers containing molten material with covers as far as practicable to retain the heat in them and keep the material in them as fluid as possible. In Figs. 5 and 6 we have shown a couple of these vessels; but they may be made of any proper size or shape to suit the operator.

In operation, when a smelting-furnace is ready to to be tapped, the car or conveyer E' is run up and the molten material tapped or flowed into it. It is then moved along the track to the particular centrifugal apparatus with which it is desired to treat the molten material and emptied or dumped into the storage or precipitating vessel, where one is used, adjacent to the centrifugal apparatus, from which vessel the material flows or is conveyed into the revolving receiving-vessel of the centrifugal apparatus. The conveyer may then, and before cooling, be quickly run up to another smelting-furnace and receive a new supply, to be in turn conveyed and dumped into the storage or precipitating vessel to flow into the centrifugal apparatus. In this way the supply of molten material furnished from several smelting-furnaces may be treated in the same centrifugal apparatus, and where two or more centrifugal apparatuses are employed they may be used either simultaneously or successively, as the quantity of molten material supplied by the smelting-furnaces may render it necessary or desirable, and while the receiving-vessel from one of the centrifugal apparatuses is being lifted out and emptied, as above described, another apparatus can be in use. In this way there need be no interruption or cessation of work, and all of the material supplied by the smelting-furnaces may be treated while in its hottest and most fluid condition. The use of two or more centrifugal apparatuses, where several smelting-furnaces are used, to permit this constant operation is the more important from the fact that it is desirable, if not indeed essential, to treat the molten material as quickly as possible after it leaves the smelting-furnaces and before it has had time to diminish in fluidity by cooling.

In conclusion we will say that we do not wish to limit ourselves to the exact arrangement of the various parts and features entering into our plant, their form, size, or peculiarities of construction or relative location on different planes, as many of these matters may be varied as the location of the plant or the conditions of operation may require or render desirable and still embody or involve the substantial features of our invention. Neither do we wish to limit ourselves to the use of all of the features or parts described or shown, as some of them may be entirely omitted to suit the location of the plant, the conditions of its operation, the state and nature of the materials to be smelted and treated, or for other reasons. To sum up, we will say that the foundation features and principle of our invention are, broadly, the use and arrangement of one or more smelting-furnaces adapted to smelt or melt the substances or materials to be treated, and one or more centrifugal apparatuses constructed, adapted, and located to receive and treat the molten material furnished by the smelting-furnaces, and cars or conveyers, adapted to be passed or conveyed between the smelting-furnaces and the centrifugal apparatuses, receiving the molten material from the smelting-furnaces and conveying it to the apparatuses operating in conjunction or co-operating to accomplish the desired end, although our invention preferably employs other parts and features in the arrangement of our plant, as above described, to operate and co-operate to secure the best, most thorough, effective, and useful results in the most speedy, convenient, and economical manner, with the greatest practicable capacity of the plant.

What we regard as new, and desire to secure by Letters Patent, is—

1. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, a car or conveyer for carrying the molten material to the centrifugal apparatus, and means for rotating the receiving-vessel, substantially as described.

2. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, a car or conveyer for carrying the molten material to the centrifugal apparatus, and means for rotating the receiving-vessel, substantially as described.

3. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, an intermediate precipitating-vessel to catch and retain the heaviest particles of the material treated, a car or conveyer for carrying the molten material to the centrifugal apparatus, and means for rotating the receiving-vessel, substantially as described.

4. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, an intermediate precipitating-vessel to catch and retain the heaviest particles of the material treated, a car or conveyer for carrying the molten material to the centrifugal apparatus, and means for rotating the receiving-vessel, substantially as described.

5. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, an intermediate storage-vessel in which the molten material may be emptied or dumped in quantity and from which it may flow in a desired stream to the centrifugal apparatus, and means for rotating the receiving-vessel, substantially as described.

6. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, an intermediate storage-vessel in which the molten material may be emptied or dumped in quantity and from which it may flow in a desired stream to the centrifugal apparatus, and means for rotating the receiving-vessel, substantially as described.

7. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, an intermediate vessel in which the molten material may be emptied or dumped in quantity and from which it may flow in a desired stream to the centrifugal apparatus, said vessel being arranged on a plane intermediate that of the smelting-furnace and the centrifugal apparatus, and means for rotating the receiving-vessel, substantially as described.

8. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, an intermediate vessel in which the molten material may be emptied or dumped in quantity and from which it may flow in a desired stream to the centrifugal apparatus, said vessel being arranged on a plane intermediate that of the smelting-furnace and the centrifugal apparatus, and means for rotating the receiving-vessel, substantially as described.

9. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, a track or way leading from the smelting-furnace to the centrifugal apparatus, a car or conveyer for conveying the molten material along the track or way to the centrifugal apparatus, and means for rotating the receiving-vessel, substantially as described.

10. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, a track or way leading from the smelting-furnace to the centrifugal apparatus, a car or conveyer for conveying the molten material along the track or way to the centrifugal apparatus, and means for rotating the receiving-vessel, substantially as described.

11. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, a track or way leading from the smelting-furnace to the centrifugal apparatus, a turn-table arranged in the track or way to facilitate the turning of a car or conveyer or transferring it from the track, a car or conveyer for carrying the molten material along the track or way to the centrifugal apparatus, and means for rotating the receiving-vessel, substantially as described.

12. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, a track or way leading from the smelting-furnace to the centrifugal apparatus, a turn-table arranged in the track or way to facilitate the turning of a car or conveyer or transferring it from the track, a car or conveyer for carrying the molten material along the track or way to the centrifugal apparatus, and means for rotating the receiving-vessel, substantially as described.

13. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, an intermediate storage-vessel in which the molten material may be emptied or dumped in quantity and from which it may flow in a desired stream to the centrifugal apparatus, a car for receiving and carrying away the material discharged from the receiving-vessel by the action of centrifugal force, and means for rotating the receiving-vessel, substantially as described.

14. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, an intermediate storage-vessel in which the molten material may be emptied or dumped in quantity and from which it may flow in a desired stream to the centrifugal apparatus, a car for receiving and carrying away the material discharged from the receiving-vessel by the action of centrifugal force, and means for rotating the receiving-vessel, substantially as described.

15. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, tracks or ways communicating with the smelting-furnaces and the centrifugal apparatuses permitting cars or conveyers carrying molten material to be run from the smelting-furnaces to the centrifugal apparatuses, cars or conveyers carrying the molten material along the tracks or ways to the centrifugal apparatuses, and means for rotating the receiving-vessels, substantially as described.

16. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, tracks or ways communicating with the smelting-furnaces and the centrifugal apparatuses permitting cars or conveyers carrying molten material to be run from the smelting-furnaces to the centrifugal apparatuses, cars or conveyers carrying the molten material along the tracks or ways to the centrifugal apparatuses, and means for rotating the receiving-vessels, substantially as described.

17. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, tracks or ways communicating with the smelting-furnaces and the centrifugal apparatuses, permitting cars or conveyers carrying molten material to be run from the smelting-furnaces to the centrifugal apparatuses, cars or conveyers carrying the molten material along the tracks or ways to the centrifugal apparatuses, a track or way arranged between the centrifugal apparatuses, a storage or precipitating vessel arranged on such track or way and movable thereon to any desired centrifugal apparatus to operate in connection therewith, and means for rotating the receiving-vessels, substantially as described.

18. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, tracks or ways communicating with the smelting-furnaces and the centrifugal apparatuses, permitting cars or conveyers carrying molten material to be run from the smelting-furnaces to the centrifugal apparatuses, cars or conveyers carrying the molten material along the tracks or ways to the centrifugal apparatuses, a track or way arranged between the centrifugal apparatuses on a plane intermediate that of the smelting-furnaces and the centrifugal apparatuses, a storage or precipitating vessel arranged on such track or way and movable thereon to any desired centrifugal apparatus to operate in connection therewith, and means for rotating the receiving-vessels, substantially as described.

19. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, tracks or ways communicating with the smelting-furnaces and the centrifugal apparatuses, permitting cars or conveyers carrying molten material to be run from the smelting-furnaces to the centrifugal apparatuses, cars or conveyers carrying the molten material along the tracks or ways to the centrifugal apparatuses, a track or way arranged between the centrifugal apparatuses, a storage or precipitating vessel arranged on such track or way and movable thereon to any desired centrifugal apparatus to operate in connection therewith, a car for receiving, carrying away, and disposing of the material treated by the action of centrifugal force, a track or way along which such car can move and communicate with the centrifugal apparatuses, and means for rotating the receiving-vessels, substantially as described.

20. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, tracks or ways communicating with the smelting-furnaces and the centrifugal apparatuses, permitting cars or conveyers carrying molten material to be run from the smelting-furnaces to the centrifugal apparatuses, cars or conveyers carrying the molten material along the tracks or ways to the centrifugal apparatuses, a track or way arranged between the centrifugal apparatuses on a plane intermediate that of the smelting-furnaces and the centrifugal apparatuses, a storage or precipitating vessel arranged on such track or way and movable thereon to any desired centrifugal apparatus to operate in connection therewith, a car for receiving, carrying away, and disposing of the material treated by the action of centrifugal force, a track or way along which such car can move and communicate with the centrifugal apparatuses, and means for rotating the receiving-vessels, substantially as described.

21. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, cars or conveyers for carrying the molten material to the centrifugal apparatuses, a track or way communicating with each of the centrifugal apparatuses, a storage or precipitating vessel arranged on such track or way and movable thereon to any desired centrifugal apparatus to operate in connection therewith, and means for rotating the receiving-vessels, substantially as described.

22. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, cars or conveyers for carrying the molten material to the centrifugal apparatuses, a track or way communicating with each of the centrifugal apparatuses on a plane intermediate that of the smelting-furnaces and the centrifugal apparatuses, a storage or precipitating vessel arranged on such track or way and movable thereon to any desired centrifugal apparatus to operate in connection therewith, and means for rotating the receiving-vessels, substantially as described.

23. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, cars or conveyers for carrying the molten material to the centrifugal apparatuses, a track or way communicating with each of the centrifugal apparatuses, a storage or precipitating vessel arranged on such track or way and movable thereon to any desired centrifugal apparatus to operate in connection therewith, a car for receiving, carrying away, and disposing of the material treated by the action of centrifugal force, a track or way along which such car can move and communicate with the centrifugal apparatuses, and means for rotating the receiving-vessels, substantially as described.

24. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, cars or conveyers for carrying the molten material to the centrifugal apparatuses, a track or way communicating with each of the centrifugal apparatuses on a plane intermediate that of the smelting-furnaces and the centrifugal apparatuses, a storage or precipitating vessel arranged on such track or way and movable thereon to any desired centrifugal apparatuses to operate in connection therewith, a car for receiving, carrying away, and disposing of the material treated by the action of centrifugal force, a track or way along which such car can move and communicate with the centrifugal apparatuses, and means for rotating the receiving-vessels, substantially as described.

25. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, a car or conveyer for carrying the molten material to the centrifugal apparatus, a tramway overhanging the centrifugal apparatus, a derrick or tackle car movable along such tramway and adapted to raise and carry the receiving-vessel to the place for emptying its contents, and means for rotating the receiving-vessel, substantially as described.

26. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated and located on a lower plane than the smelting-furnace, a car or conveyer for carrying the molten material to the centrifugal apparatus, a tramway overhanging the centrifugal apparatus, a derrick or tackle car movable along such tramway and adapted to raise and carry the receiving-vessel to the place for emptying its contents, and means for rotating the receiving-vessel, substantially as described.

27. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated, cars or conveyers for carrying the molten material to the centrifugal apparatuses, a tramway overhanging the centrifugal apparatus, a derrick or tackle car movable along such tramway and adapted to raise and carry the receiving-vessel to the place for emptying its contents, a car for receiving, carrying away, and disposing of the material treated by the action of centrifugal force, a track or way along which such car can move and communicate with the centrifugal apparatuses, and means for rotating the receiving-vessels, substantially as described.

28. In a plant for smelting ores and centrifugally treating the resulting materials and handling and disposing of the materials treated, the combination of a number of smelting-furnaces for reducing ores to a molten condition, a number of centrifugal apparatuses provided with revoluble receiving-vessels adapted to receive molten material to be treated and located on a lower plane than the smelting-furnaces, cars or conveyers for carrying the molten material to the centrifugal apparatuses, a tramway overhanging the centrifugal apparatus, a derrick or tackle car movable along such tramway and adapted to raise and carry the receiving-vessel to the place for emptying its contents, a car for receiving, carrying away, and disposing of the materials treated by the action of centrifugal force, a track or way along which such car can move and communicate with the centrifugal apparatuses, and means for rotating the receiving-vessels, substantially as described.

29. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench, excavation, or depression, which wholly or partially receives it and which is provided with sufficient covering to afford a surface to permit operations over or about the top of the apparatus, a car or conveyer for carrying the molten material to the centrifugal apparatus, and means for rotating the receiving-vessel, substantially as described.

30. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench, excavation, or depression, which wholly or partially receives it and which is provided with sufficient covering to afford a surface to permit operations over or about the top of the apparatus, an intermediate precipitating-vessel to catch and retain the heaviest particles of the material treated, a car or conveyer for carrying the molten material to the centrifugal apparatus, and means for rotating the receiving-vessel, substantially as described.

31. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench, excavation, or depression, which wholly or partially receives it and which is provided with sufficient covering to afford a surface to permit operations over or about the top of the apparatus, an intermediate storage-vessel in which the molten material may be emptied or dumped in quantity and from which it may flow in a desired stream to the centrifugal apparatus, and means for rotating the receiving-vessel, substantially as described.

32. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench, excavation, or depression, which wholly or partially receives it and which is provided with sufficient covering to afford a surface to permit operations over or about the top of the apparatus, an intermediate vessel in which the molten material may be emptied or dumped in quantity and from which it may flow in a desired stream to the centrifugal apparatus, said vessel being arranged on a plane intermediate that of the smelting-furnace and the centrifugal apparatus, and means for rotating the receiving-vessel, substantially as described.

33. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench, excavation, or depression, which wholly or partially receives it and which is provided with sufficient covering to afford a surface to permit operations over or about the top of the apparatus, an intermediate storage-vessel in which the molten material may be emptied or dumped in quantity and from which it may flow in a desired stream to the centrifugal apparatus, a car for receiving and carrying away the material discharged from the receiving-vessel by the action of centrifugal force, and means for rotating the receiving-vessel, substantially as described.

34. In a plant for smelting ores and centrifugally treating the resulting materials and handling and disposing of the materials treated, the combination of a smelting-furnace for reducing ores to a molten condition, a centrifugal apparatus provided with a revoluble receiving-vessel adapted to receive molten material to be treated, and located in a trench or excavation, which wholly or partially receives it and which is provided with sufficient covering to afford a surface to permit operations over or about the top of the apparatus, a car or conveyer for carrying the molten material to the centrifugal apparatus, a tramway overhanging the centrifugal apparatus, a derrick or tackle car movable along such tramway and adapted to raise and carry the receiving-vessel to the place for emptying its contents, and means for rotating the receiving-vessel, substantially as described.

PHINEAS H. ADAMS, Jr.
ORSEMAS T. X. ADAMS.

Witnesses:
THOMAS A. BANNING,
EPHRAIM BANNING.